Figure 1:
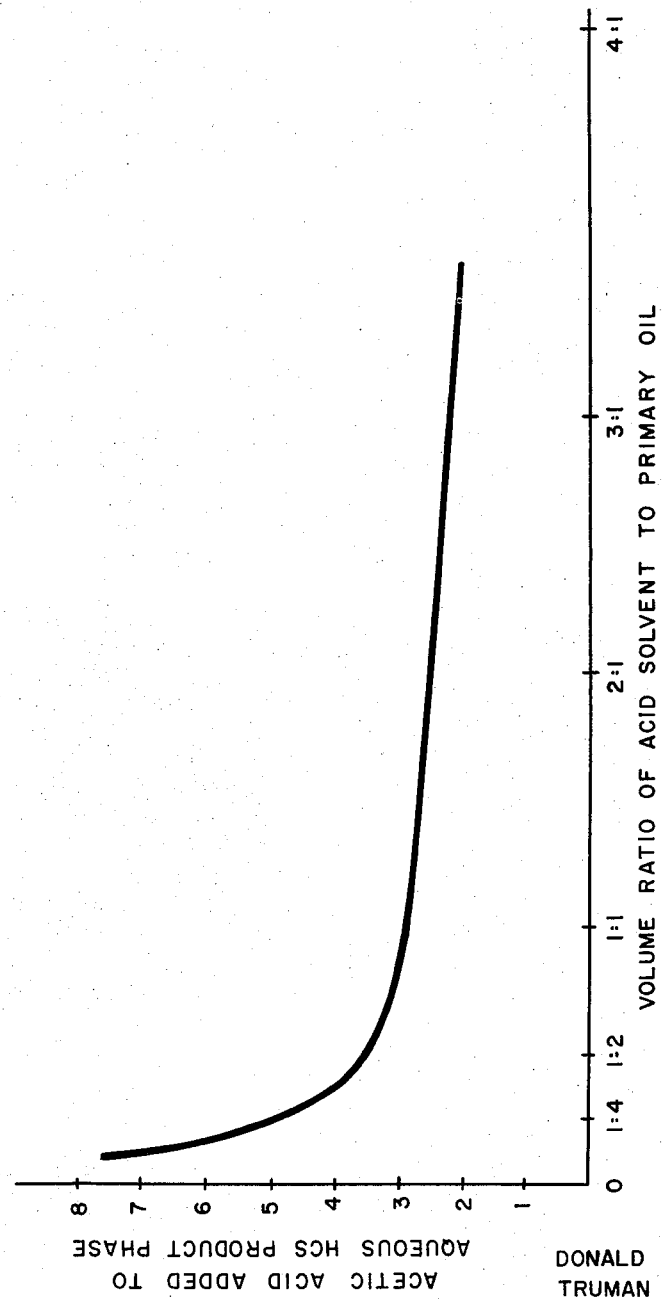

Fig. I

DONALD G. CAIN
TRUMAN P. MOOTE
INVENTORS.

BY
ATTORNEY

DONALD G. CAIN
TRUMAN P. MOOTE
INVENTORS.

ATTORNEY

2,877,257

PROCESS FOR PURIFICATION OF HYDROCARBON SOLUTIONS OF OXYGENATED ORGANIC COMPOUNDS

Donald G. Cain, Brownsville, Tex., and Truman P. Moote, Tulsa, Okla., assignors to Pan American Petroleum Corporation, a corporation of Delaware Application November 28, 1956, Serial No. 624,872

11 Claims. (Cl. 260—450)

The present invention relates to an improved process for the purification of hydrocarbon solutions of oxygenated organic compounds comprising acids and which also may contain dissolved or occluded metal contaminants such as iron or iron compounds. It pertains more particularly to an improved method and means for effecting separation of said metal contaminants from said hydrocarbon solutions, and elimination of other precipitatable contaminants encountered during presently known purification procedures and for recovering said acids in a highly purified condition.

The contaminated hydrocarbon organic chemical mixture may be a product produced by oxidation of hydrocarbons or other carbonaceous material, or it may be a contaminated hydrocarbon solution of organic acids from any other source, but the invention is particularly applicable to the so-called primary oil stream which is separated from the mixture of products produced by synthesis when carbon monoxide and hydrogen are reacted with a promoted iron catalyst at pressures in the range of about 150 to 500 p. s. i. g. and temperatures in the range of 550° to 700° F. The oil stream resulting from such a process contains large amounts, which may range from about 10 to 30 percent, of organic chemicals such as acids, alcohols, ketones, aldehydes, esters, etc. The acid component present in the oil stream in general has the following composition:

| Acid: | Volume percent |
|---|---|
| Propionic | 0.8 |
| Butanoic | 6.1 |
| Pentanoic | 16.5 |
| Hexanoic | 17.6 |
| Heptanoic | 18.5 |
| Octanoic | 11.7 |
| Nonanoic and higher | 28.8 |

The primary oil also contains dissolved or occluded metal contaminants such as iron or iron compounds which may be present in amounts from about 0.01 to 2.0 weight percent, based on the weight of primary oil.

An object of the invention is to provide improved methods and means for separating said contaminants so that they will not interfere with subsequent chemicals purification or subsequent conversion of hydrocarbon-chemicals mixtures into high quality motor fuels and/or distillate fuels.

This last-named conversion is usually effected by contacting a vaporized hydrocarbon-organic compound mixture with an alumina catalyst such as activated alumina gel, bauxite, synthetic silica-alumina catalysts and the like, at a temperature in the range of about 700° to 900° F. and a pressure from about atmospheric to 50 p. s. i. with a contact time sufficient to effect deoxygenation of chemicals and isomerization of the original and produced olefins. Contaminants of the oil stream produced in the synthesis step have been found to deleteriously affect the alumina catalyst in the subsequent conversion step and an important object of my invention is to provide improved methods and means for removing said contaminants from streams which are to be contacted with such catalyst.

Moreover, with hydrocarbon solutions containing aldehydes, the latter tend to polymerize during the deoxygenation step to tarry intractable resins in the presence of impurities such as iron; a condition which obviously must be prevented. Likewise, if it is desired to separate the chemicals from the primary oil, the presence of iron is to be carefully avoided in the subsequently recovered mixture of chemicals since on heating the latter to effect a separation of the chemicals into their respective classes, the aldehydes tend to polymerize in the presence of iron thus substantially completely destroying this otherwise recoverable component, as well as rendering more difficult the recovery and purification of the remaining classes of chemicals present in the mixture being treated.

In the event it is desired to recover the chemicals from the oil instead of subjecting them to deoxygenation as mentioned above, they may be extracted therefrom by the use of an aqueous solution of soap, for example in accordance with the procedure described and claimed in Walker U. S. 2,691,669. While this method of removing chemicals from the oil is satisfactory, there are a number of process complications that arise which tend to lessen the effectiveness of the overall extraction process. Thus, on extraction of the oil with an aqueous soap solution a sludge is frequently observed to appear at the oil-soap interface causing a filtration problem. Also, after the oil has been extracted with an aqueous soap solution the resulting extract is subject to a stripping operation to take the chemicals overhead and recover the lean soap as a bottoms stream. In this distillation or stripping step, however, foaming within the column frequently becomes excessive and as a result the feed rates to the column must be materially reduced causing appreciable reduction in column capacity. Also, the packing in the column tends to become plugged with tarry materials which accumulate in the system after the soap solution has been recycled for a period of time. A further difficulty encountered is the fact that when it is desired to regenerate acids from the excess soap formed in the neutralization of acids in the oil, a precipitate of sludge appears when the acids are regenerated. This, of course, gives rise to a filtration problem which is often troublesome. The acids thus obtained are frequently contaminated with nonsaponifiable materials which impart an undesirable color to the acids on ageing.

Accordingly, it is an object of our invention to provide a simple and effective means for removing objectionable impurities from oils of the type contemplated herein prior to subjecting them to further refining operations. It is another object of our invention to provide a method for maintaining the soap, employed to extract chemicals from hydrocarbon solutions, in a highly efficient form over extended periods of use. It is a further object of our invention to provide conditions whereby excessive foaming is not encountered during the stripping of chemicals from an aqueous soap extract thereof. It is still another object of our invention to provide a method for securing acids from the aforesaid soap solutions, by acid regeneration, which are substantially free from nonsaponifiable impurities.

It has previously been thought that column plugging and the occurrence of nonsaponifiable materials in acids derived by regeneration of the aforesaid aqueous soap solutions resulted from decomposition of the soap itself and from polymerization of various carbonyl compounds in the oil. While the soap may tend to decompose slightly with use over long periods of time, we have found that the aforesaid difficulties are not caused to any appreciable extent by such factors. On the contrary we have observed that two readily removable impurities, iron and amines (in the case of HCS oil) are the principal causes for the above-mentioned trouble. Amine compounds presumably are formed by fixation of nitrogen which frequently is present in synthesis gas to the extent of from about 3 to 5 percent. The amines thus produced in the presence of heat tend to react with carbonyl compounds giving rise to at least one source of the polymeric and tarry residues encountered during the processing of the soap extract.

We have found, however, that soluble iron or other similar metal contaminants and amines can be readily removed from hydrocarbon solutions thereof by subjecting the latter, prior to neutralization of the acids therein, to extraction with an aqueous acid solution. In this connection it is important to point out that the acid solution which we employ is in the form of an aqueous solution and is not of sufficient strength to react to any appreciable extent with the olefins or with the chemicals which may be dissolved in the oil.

In carrying out the process of our invention crude hydrocarbon synthesis oil, for example, is first washed with an aqueous acid solution. This washing step, depending on the strength of the acid solution, is repeated until no brown precipitate is produced on the addition of a suitable base, such as ammonium hydroxide, to the acid extract. When extraction has proceeded to this stage, the absence of such a precipitate on neutralization indicates removal of the metal contaminant. If an amine is present in the oil, further extraction of the latter with aqueous acid serves to remove the amine therefrom. The presence of the amine is generally detected by the appearance of a white precipitate when ammonium hydroxide or other suitable base is added to the acid extract. Ordinarily it will be found that the metal contaminant is removed from the oil before the amine has been completely extracted.

The oil treated in this manner is then neutralized with an aqueous caustic solution to produce an upper neutral oil layer containing dissolved chemicals. No sludge is apparent at the interface of these two layers. Thereafter, the lower aqueous soap layer is subjected to a stripping step whereby dissolved chemicals are recovered overhead. Maximum column throughputs are employed with no flooding or appreciable foaming occurring. Also, no plugging of the column packing is observed. Dissolved chemicals present in the aqueous acid extract are recovered by distillation and the acid returned for use in a subsequent extraction step. The net soap make resulting from treating subsequent charges of crude hydrocarbon synthesis oil may be subjected to an acid regeneration step in the usual manner to recover acids free from sludge and nonsaponifiable contaminants.

The acids employed in carrying out the process of our invention may be organic or inorganic, such as for example, phosphoric, hydrochloric, sulfuric, acetic, benzene sulfonic, chloracetic, and the like. Also, the crude aqueous phase resulting from hydrocarbon synthesis when properly fortified with acids such as, for example, acetic or propionic acids, may be used as a convenient source of the aqueous acid extract used to remove the aforesaid impurities from the oil. An additional and convenient source of acids for use in our invention is also provided by subjecting the aforesaid aqueous hydrocarbon synthesis phase to distillation so as to take overhead only the nonacid components giving a bottoms consisting essentially of acids. This bottoms material serves as an efficient and economical extract for removing impurities of the above-mentioned type from the oil. In utilizing the aforesaid crude aqueous phase as a source of the aqueous acid extract, such phase should be enriched with an acid, such as for example, acetic acid, to give a solution having an acid content of the order of at least about 4.5 weight percent if it is desired to effect removal of substantially all of the metal contaminants in a single extraction step.

The acids used in the extraction step should be employed in the form of an aqueous solution in strengths corresponding to concentrations of sulfuric acids ranging from about 1.5 to about 50 weight percent. With the more dilute acid solutions in the aforesaid concentration range the number of extractions required for removal of the impurities generally will be higher than is needed when stronger acid solutions are employed. The number of extractions required for removal of such impurities also depends on the volume ratio of extract to oil used, with higher volume ratios of extract to oil requiring fewer extractions for a solvent solution of a given acid concentration. The concentration of acid in the extract may be lower than 1.5 weight percent (sulfuric acid equivalent), however, more extractions and/or higher volume ratios of extract to oil will ordinarily be required. At sulfuric acid concentrations appreciably above 50 weight percent the tendency of unsaturated compounds to react with the acids is increased. Accordingly, we generally prefer to employ aqueous solutions of sulfuric acid (or equivalent) in which the concentration of said acid is not greater than about 50 weight percent. The less highly ionized acids may be used in concentrations greater than 50 weight percent, however, the concentration of hydrogen ions in such an aqueous extract solution should not be substantially greater than that existing in a 50 weight percent aqueous solution of sulfuric acid. On the basis of experimental evidence, for example, we have found that when used in the same volume ratios of solvent to oil a 1.9 weight percent sulfuric acid solution is substantially equivalent to about a 4.5 to 5 weight percent acetic acid solution in its ability to remove said impurities from hydrocarbon synthesis oil in a single extraction step. Accordingly, since the concentration of acid required to produce the same result will vary under otherwise fixed conditions we shall express, where expedient to do so, the amount of acid needed to yield a certain result, as a concentration of acetic acid, sulfonic acid, or similar acids equivalent in strength to an aqueous sulfuric acid solution having a concentration of from about 1.5 to about 50 weight percent. Generally, for convenience and efficiency these acid concentrations preferably should be in the range of from about 3.5 to about 10 or 12 weight percent.

With reference to the effect of acid concentration in the extract solution and volume ratio of solvent to oil, the graph in Figure I shows the concentration of acetic acid required for a given volume ratio of solvent to oil to effect removal of iron from primary oil in one extraction step. At any point on or above the curve the combination of acid concentration and volume ratio of solvent to oil represented thereby can be employed to remove iron from hydrocarbon synthesis oil in a satisfactory manner. Below the curve iron is not removed from the oil in one extraction step when using the combination of acid concentration and solvent to oil volume ratio indicated.

In obtaining the plot shown in Figure I, the solvent employed was acid (acetic acid)-enriched water product phase from hydrocarbon synthesis. This phase normally contains $C_1$ to $C_4$ alcohols, $C_2$ to $C_4$ aldehydes and $C_2$ to $C_4$ acids. This stream contains generally about 2.5 weight percent acids, calculated as acetic acid. The curve in Figure I shows the weight percent of acetic acid that should be added to said water product phase at a given volume ratio of solvent to oil to remove iron from the latter in one extraction step.

In performing the process of our invention the extraction step is preferably carried out until a precipitate is no longer produced when a suitable water-soluble base such as, for example, caustic soda or ammonium hydroxide, is added to the aqueous acid extract. The precipitate first formed, particularly if iron is present as the objectionable metal contaminant, is usually brownish in color. With hydrocarbon synthesis oil we have also observed the appearance of a white precipitate which gives a positive nitrogen test, is insoluble in water and in alkali, and soluble in dilute acid. Such characteristics indicate that this nitrogen containing impurities is an amine.

Our invention is also illustrated by the following examples:

EXAMPLE I

This example is given to show that acids derived from primary HCS oil via neutralization followed by acid regeneration are not accompanied by the appearance of a sludge if said oil has been properly washed with a dilute acid solution prior to neutralization. In carrying out this experiment primary HCS oil, produced in the presence of a fluidized iron catalyst, was washed with a 3.9 weight percent sulfuric acid solution in which the volume ratio of aqueous acid to oil was 4:1. Washing was continued until no brown flocculent precipitate appeared on neutralizing the resulting extract with a 25 weight percent ammonium hydroxide solution. Thereafter the washed oil was neutralized with a 20 weight percent sodium hydroxide solution to give a 40 weight percent soap solution. The latter was thereafter stripped to remove overhead, the non-acid chemicals leaving a bottoms consisting essentially of a 40 weight percent aqueous soap solution. The extract obtained from the dilute acid washing step was also stripped to remove water-soluble chemicals overhead. The acid bottoms was then returned for reuse in the initial oil washing process. The stripped soap referred to above was next subjected to an acid liberation step by adding thereto a solution of 50 weight percent sulfuric acid.

In a separate run primary oil was treated as described above with the exception that the washing step with dilute acid was omitted, thereafter, the presence or absence of sludge in each case was noted. The results obtained with both washed and unwashed oil and the effect of such washing step are shown in the table below:

*Table 1*

| Charge to first wash: | Weight, grams |
|---|---|
| Primary oil | 1535 |
| Acid | 101 |
| Alcohol | 173 |
| Carbonyl | 156 |
| 3.9 wt. percent H$_2$SO$_4$ soln | 501 |
| Total | 2036 |

| Recovery from first wash: | |
|---|---|
| Raffinate oil | 1521 |
| Extract | [1] 514 |
| Total | 2035 |
| Recovery _____ wt. percent | 99.9 |

| Charge to second wash: | |
|---|---|
| Washed oil | 1521 |
| 3.9 wt. percent H$_2$SO$_4$ | 502 |
| Total | 2023 |

| Recovery from second wash: | |
|---|---|
| Raffinate | 1507 |
| Acid | 92 |
| Alcohol | 153 |
| Carbonyl | 147 |
| Extract | [2] 519 |
| Total | 2026 |
| Recovery _____ wt. percent | 100 |

| Distillate from extracts: | |
|---|---|
| Extract product | 28.8 |
| Acid | ____ |
| Alcohol | 148 |
| Carbonyl | 118 |

| Mol balance: | | |
|---|---|---|
| Acid | | ____ |
| Alcohol | mol percent | 97.5 |
| Carbonyl | do | 101 |

[1] Sludge appeared at oil-solvent interface; sample of extract not including the sludge layer neutralized with ammonium hydroxide solution produced brown flocculent precipitate.
[2] No sludge at interface; sample of extract neutralized with ammonium hydroxide gave no brown flocculent precipitate.

Approximately equivalent quantities of soaps were prepared from each of the washed and unwashed oil samples referred to above by the addition of sodium hydroxide. The resulting soap solution in each case was separated and sulfuric acid added thereto to liberate the organic acids. In the acids regenerated from soap derived from unwashed oil a sludge amounting to 9 grams was obtained while with the regenerated acids derived from the washed oil fraction no sludge could be isolated.

EXAMPLE II

The results shown in this example illustrate the effect of acid concentration on the removal of iron from HCS oil of the type mentioned above. In this work 100 ml. of oil was given to washes with a 1.9 weight percent sulfuric acid solution in which the volume ratio of oil to said solution was 4:1. In a second run primary HCS oil was subjected to similar treatment under the same conditions except that the extractant solution contained only 0.9 weight percent sulfuric acid solution. In each case the extract obtained was made basic with ammonium hydroxide to test for the presence of iron. The results obtained are shown in the table below:

*Table 2*

| Test No. | 1 | | 2 | | | | |
|---|---|---|---|---|---|---|---|
| Volume of Oil ____ ml | 100 | | 100 | | | | |
| Volume of Extractant ____ ml | 25 | | 25 | | | | |
| Concentration of Sulfuric Acid in Wash, wt. percent ____ ml | 1.9 | | 0.9 | | | | |
| | 1st Extract | 2nd Extract | 1st Extract | 2nd Extract | 3rd Extract | 4th Extract | 5th Extract |
| Observations after making Extract Basic. | Brown, flocculent ppt. | White ppt. | Brown, flocculent ppt. | White ppt., on standing a brown ppt. formed. | White ppt. only. | A small amount of white ppt. | No ppt. |

The white precipitate referred to in the table above was found to be insoluble in water and alkali, but soluble in dilute acid. It gave a positive nitrogen test and accordingly is believed to be an amine derived by fixation of nitrogen during synthesis. The above data indicate that with a sulfuric acid solution of 1.9 weight percent, using an oil to solvent volume ratio of 4:1, the iron contaminant in HCS oil can be removed in two extractions whereas with an extractant solution containing only 0.9 weight percent three extractions are required under otherwise similar conditions. It is further shown that with additional extraction the white precipitate can also be removed even with the more dilute acid solvent.

EXAMPLE III

Differences in acids and soaps derived from washed and unwashed oil are demonstrated in the following example. Substantially equal amounts of washed [1] and unwashed primary HCS oil were neutralized with sufficient caustic to yield a lower aqueous layer containing soap and chemicals. The resulting lower layer was next subjected to distillation to remove dissolved chemicals overhead. Sufficient water was removed from the bottoms fraction obtained from this distillation step to give a 50 weight percent soap solution. Both soap solutions were quite clear and had the same light yellow color. Thereafter, 20 ml. samples of each soap were treated with 5 ml. of 30 percent hydrogen peroxide. This treatment appeared only to lighten the color of both samples. Treatment of the individual soap samples and the conditions under which such tests were carried out are given, with results, in the table below.

Table 3

| | Unwashed Primary Oil | Washed Primary Oil |
|---|---|---|
| Soap Preparation: | | |
| Acids charged, gm | 63.4 | 61.6. |
| Acids Neutral Equivalent, gm./Mol. | 129 | 138. |
| NaOH (dry), gms | 17.8 | 19.7. |
| Water added, gms | 65.5 | 63.3. |
| Water of reaction, gms | 8.9 | 8.0. |
| Soap (dry) calc'd, gms | 74.4 | 71.3. |
| Appearance of Soap after Dilution to 25 Wt. percent with Water. | Tarry, sticky material sticking to sides of container. | Nothing precipitated. |
| Foam Test of Soap Diluted to 25 Wt. percent: | | |
| Foam height, cm | 6.5 to 8 | 3.5 to 4.5. |
| Foam stability, seconds (time required for foam to break). | 53 to 59 | 19 to 20. |
| Appearance of Acids after Pentane Dilution (5 ml. acids dil. to 100 ml. with pentane). | A black precipitate settled out. | A small amount of precipitate appeared. |

Figure 2:
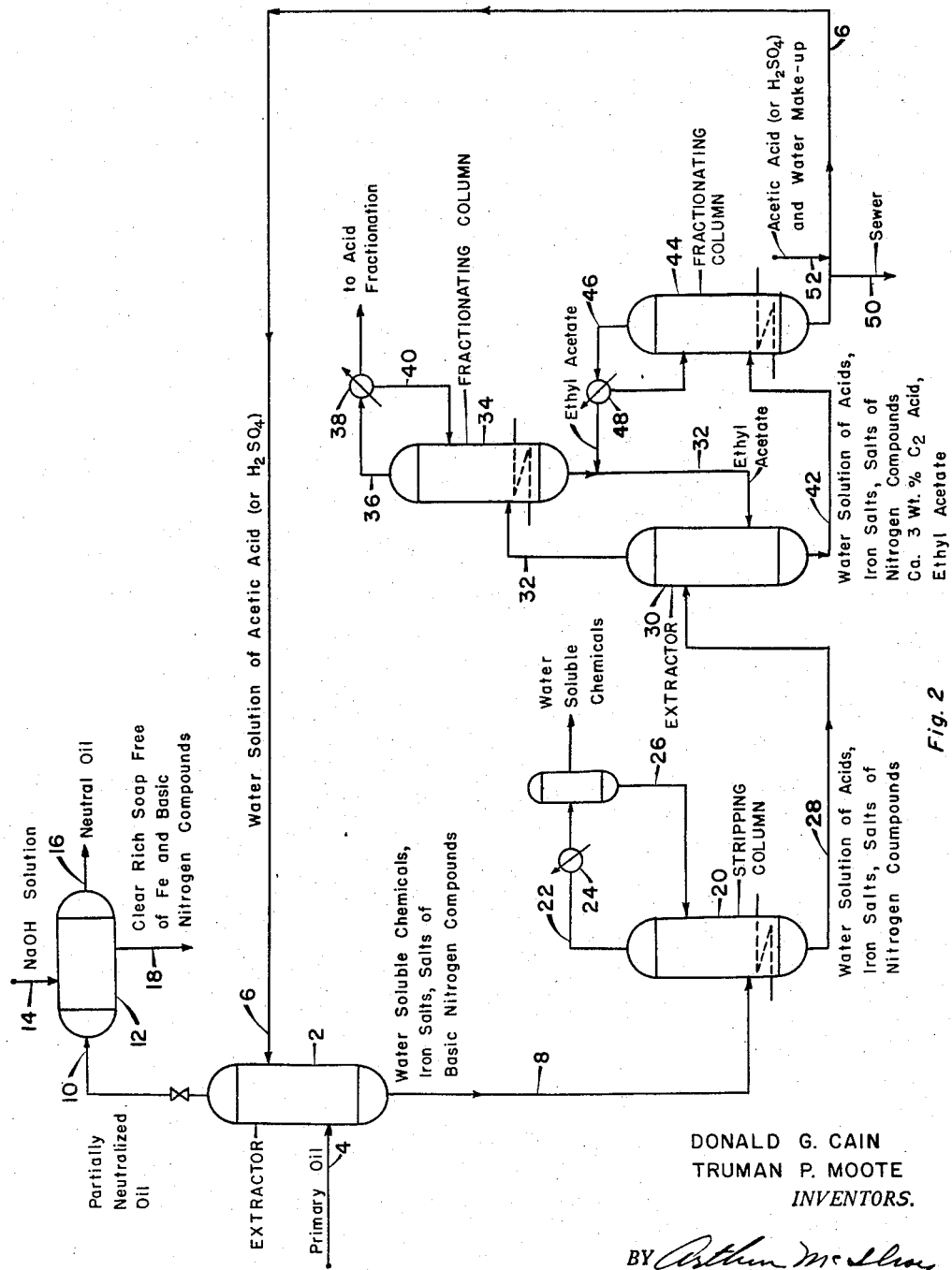

The process of our invention is further illustrated by reference to the flow diagram of Figure 2 wherein, for example, primary oil from hydrocarbon synthesis is introduced into extractor 2 through line 4 and is countercurrently contacted, for instance, with a 5 percent aqueous solution of acetic acid or sulfuric acid introduced at a point near the top of the extractor through line 6. From the base of extractor 2 there is withdrawn through line 8 an aqueous extract of water-soluble chemicals, metal (iron) salts, and salts of basic nitrogen compounds. Washed primary oil emerges from the top of the extractor through line 10 and is transferred into neutralization vessel 12 where it is mixed with a suitable quantity of an aqueous 20 percent sodium hydroxide solution added through line 14. As a result of this neutralization step, an upper neutral oil layer is withdrawn through line 16 for further treatment outside the scope of this invention. From the bottom of vessel 12 a rich aqueous soap solution, free of iron and basic nitrogen compounds, is withdrawn through line 18. Dissolved chemicals may be recovered therefrom by distillation in a known manner. Carboxylic acids may be obtained from the residual soap solution by regeneration thereof in a known manner with sulfuric or other suitable acids. The aqueous acid extract in line 8 is transferred to a stripping column 20 where the water-soluble chemicals present therein are taken overhead in the form of an aqueous distillate through line 22 and condenser 24. A portion of this overhead is returned through line 26 to the column as reflux. The bottoms fraction present in column 20 consists essentially of water, acids, iron salts and salts of nitrogen compounds and is withdrawn through line 28 and transferred to extractor 30 where said fraction is countercurrently contacted with a suitable solvent for said acids, such as for example ethyl acetate, the latter being introduced through line 32. Overhead from extractor 30 an ethyl acetate extract rich in acids is taken through line 32 and transferred to fractionating column 34 where dissolved acids are removed as an overhead therefrom through line 36 and condenser 38. The mixture of acids thus obtained may then be further separated into pure individual fractions. A portion of the overhead product stream in line 36 is recycled through line 40 to the column as reflux. The raffinate portion from extractor 30, withdrawn through line 42, is transferred to fractionating column 44 where ethyl acetate dissolved therein is separated as an overhead stream through line 46 and condenser 48. This ethyl acetate stream is then combined with the bottoms fraction from column 34 and used as solvent for operation of extractor 30. The bottoms fraction from column 44 is withdrawn through line 6 and returned to extractor 2 for a succeeding cycle. In order to avoid excessive build-up of iron salts and other objectionable impurities in the system, from about 5 to 10 volume percent of the stream in line 6 is purged through line 50 while makeup acid may be added to the system as needed through line 52.

It is to be understood, of course, that the process illustrated by the foregoing examples and by the accompanying flow diagram are merely preferred embodiments of our invention and are to be in no way considered as limiting the scope thereof. Although our process is especially adapted for the treatment of raw primary hydrocarbon synthesis oil as illustrated above, it is also applicable to the purification of any oil from which it is desirable to remove iron or similar undesirable impurities and/or basic nitrogen compounds. Thus, for example, our process may be employed in the purification of acidic mineral or vegetable oils containing dissolved contaminants of the aforesaid type. Moreover, while we have generally indicated in the foregoing description that the acid component of the oils treated in accordance with our invention consists of the acids found in raw primary hydrocarbon synthesis oil, the source of the acid component is not important, i. e., it may consist of another organic acid or acids not produced in hydrocarbon synthesis or it may be a mineral acid, such as for example sulfuric acid, phosphoric acid, etc. In other words, whether a "soap" or a "salt" is produced by the neutralization step, our process may be employed for the purpose of removing the aforesaid dissolved impurities from the oil.

It should be further understood that our process may be utilized in conjunction with other procedures for treating oils of the type herein contemplated or for separating other components from such oils. The expression "basic derivatives" appearing herein is to be construed as referring to the oil insoluble product formed by reaction of a suitable water-soluble base with impurities of the above mentioned type.

What we claim is:

1. In a process for the purification of a hydrocarbon solution containing oxygenated organic compounds including organic acids and containing as dissolved contaminants a basic nitrogen compound and a metal, the basic derivatives of which are substantially insoluble in said hydrocarbon solution, the improvement which comprises extracting said hydrocarbon solution with a solution of an acid in a substantially oil insoluble aqueous solvent, said acid being present in the latter solution in an amount equivalent to a sulfuric acid concentration of from about 1.5 up to about 50 weight percent, and continuing the extraction of said hydrocarbon solution with said acid solution until a precipitate is no longer produced when the resulting acidic extract is neutralized.

2. The process of claim 1 in which the hydrocarbon solution is raw primary hydrocarbon synthesis oil.

---
[1] Obtained in accordance with conditions set out in Example I.

3. The process of claim 1 in which said contaminant is a basic nitrogen compound.

4. In a process for the purification of raw primary hydrocarbon synthesis oil contaminated with iron and a basic nitrogen compound produced during the synthesis of said oil, the improvement which comprises extracting said oil with a solution of an acid in a substantially oil insoluble aqueous solvent, said acid being present in the latter solution in an amount equivalent to a sulfuric acid concentration of from about 1.5 up to about 50 weight percent, and continuing the extraction of said oil with said acid solution until a precipitate is no longer produced when the resulting acidic extract is neutralized.

5. The process of claim 1 in which an aqueous acid solution is employed having an acid concentration equivalent to a sulfuric acid concentration of from about 3.5 to about 12 weight percent.

6. The process of claim 4 in which an aqueous acid solution is employed having an acid concentration equivalent to a sulfuric acid concentration of from about 3.5 to about 12 weight percent.

7. The process of claim 1 in which the acid employed in the extractant solution is sulfuric acid.

8. The process of claim 4 in which the acid employed in the extractant solution is sulfuric acid.

9. In a process for the purification of a hydrocarbon solution containing oxygenated organic compounds including organic acids and containing as a contaminant a basic nitrogen compound, the improvement which comprises extracting said hydrocarbon solution with a solution of an acid in a substantially oil insoluble aqueous solvent, said acid being present in the latter solution in an amount equivalent to a sulfuric acid concentration of from about 1.5 up to about 50 weight percent, and continuing the extraction of said hydrocarbon solution with said acid solution until a precipitate is no longer produced when the resulting acidic extract is neutralized.

10. The process of claim 9 in which the basic nitrogen compound is an amine.

11. The process of claim 4 in which the basic nitrogen compound is an amine.

References Cited in the file of this patent

UNITED STATES PATENTS

| | | |
|---|---|---|
| 1,704,732 | Eisenhut et al. | Mar. 12, 1929 |
| 2,540,129 | Lauer et al. | Feb. 6, 1951 |
| 2,569,384 | Morrell et al. | Sept. 25, 1951 |
| 2,586,929 | Fleming et al. | Feb. 26, 1952 |
| 2,644,006 | Van der Waals | June 30, 1953 |